United States Patent [19]

Horiguchi

[11] Patent Number: 4,680,643
[45] Date of Patent: Jul. 14, 1987

[54] IMAGE DISPLAY APPARATUS
[75] Inventor: Toshio Horiguchi, Hachioji, Japan
[73] Assignee: Olympus Optical Co., Ltd., Tokyo, Japan
[21] Appl. No.: 711,921
[22] Filed: Mar. 15, 1985
[30] Foreign Application Priority Data
  Mar. 19, 1984 [JP] Japan .................. 59-51079
[51] Int. Cl.$^4$ ............................. H04N 1/40
[52] U.S. Cl. .................... 358/280; 358/258; 358/183; 340/724
[58] Field of Search ........... 358/280, 282, 288, 293, 358/294, 256, 258, 22, 108, 183; 340/724

[56] References Cited

U.S. PATENT DOCUMENTS

| | | | |
|---|---|---|---|
| 3,437,873 | 4/1969 | Eggert ........................... | 358/183 X |
| 4,238,773 | 12/1980 | Tsuboka et al. ................ | 358/183 |
| 4,266,242 | 5/1981 | McCoy ........................... | 358/183 X |
| 4,267,560 | 5/1981 | Ishikawa et al. ............... | 358/22 |
| 4,276,567 | 6/1981 | Wellendorf et al. ............ | 358/280 |
| 4,342,052 | 7/1982 | Rackley et al. ................. | 358/280 X |
| 4,345,276 | 8/1982 | Colomb .......................... | 358/258 |
| 4,485,408 | 11/1984 | Kamizyo et al. ................ | 358/280 X |
| 4,538,183 | 8/1985 | Kanno et al. ................... | 358/280 |
| 4,556,918 | 12/1985 | Yamazaki et al. .............. | 358/280 X |
| 4,561,020 | 12/1985 | Matsuda ......................... | 358/183 X |
| 4,618,859 | 10/1985 | Ikeda ............................. | 340/724 |

FOREIGN PATENT DOCUMENTS 54-12769  5/1979  Japan .

Primary Examiner—Edward L. Coles, Sr.
Attorney, Agent, or Firm—Armstrong, Nikaido, Marmelstein & Kubovcik

[57] ABSTRACT

An image display apparatus comprises means for storing segment addresses of a plurality of selected image data and means for selectively taking out the segment addresses and forming addresses of an image memory of one picture plane on which those plurality of image data are combined and displayed. The segment address storing means is constituted by address registers which are cascade connected. The image memory address forming means is constituted by means for adding the selected segment address data and an output of a pixel counter.

4 Claims, 5 Drawing Figures

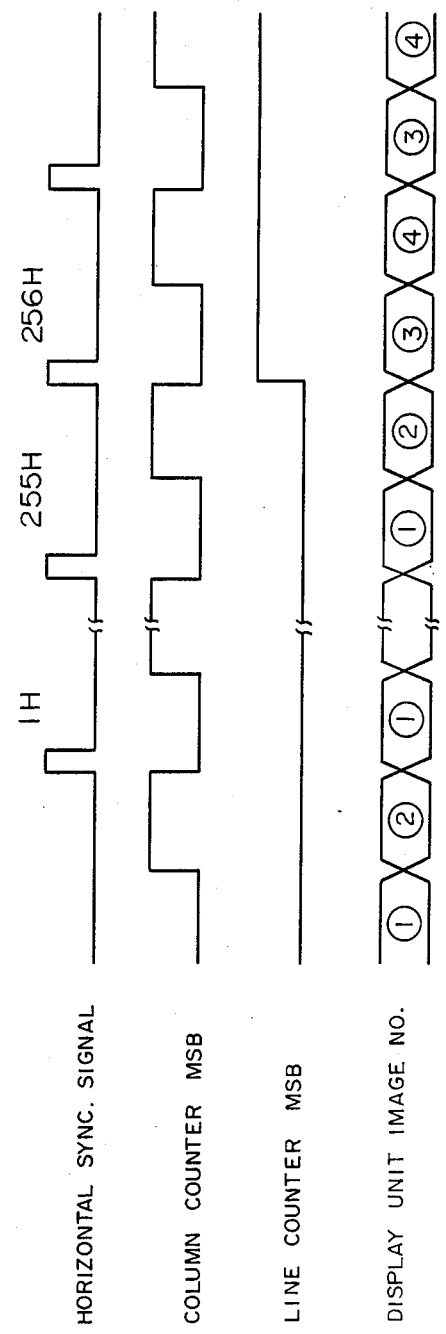

IMAGE DISPLAY APPARATUS

BACKGROUND OF THE INVENTION

The present invention relates to an image display apparatus of a video RAM system in which one picture plane of display means such as a CRT or the like is divided and a plurality of images are simultaneously displayed on those divided picture planes.

Generally, medical images, for instance, images which are obtained by observing the affected part in the body cavity of a human body by an endoscope and photographing the affected part, or the like are converted to electrical signals and are further stored in a memory medium of a large capacity such as an optical disk, magnetic disk or the like, thereby constituting an image file apparatus. A desired image is picked up from among the images stored in such an image file apparatus and is displayed on the display apparatus, thereby making use of it as one means for diagnosis.

In display of such medical images on the display apparatus, in order to realize easy comparison and diagnosis of the affected part, it is required to simultaneously display on the same screen a plurality of images such as, for example, (about twenty) images photographed in a single diagnosis for one patient by the endoscope, images photographed in the past by the endoscope for the same patient, images photographed with respect to the same portion of other patients who have the same disease, or the like.

Hitherto, as image display means for displaying a plurality of images on the same screen, for example, as shown in the Official Gazette of Japanese Patent Application Publication Laid-Open No. 12769/1979, image display means using a storage tube has been known. In this image display means, a plurality of images are recorded at different locations on the storage tube and the whole surface of the storage tube is scanned by an electron beam upon reproduction to read out signals, thereby allowing a plurality of images to be displayed.

However, the display means using such a storage tube has drawbacks such that images cannot be accurately displayed since there are not only restrictions in resolutions but also distortions upon recording and reproduction, and also the apparatus increases in size. Further, there are also drawbacks such that the display locations of the images which have been once stored and recorded in the storage tube cannot be changed upon reproduction and it is also difficult to change the images by newly storing image information, and the like.

As another conventional example, the image display means for transferring image data from a CPU to a display apparatus having a frame memory and allowing a plurality of images to be displayed on this display apparatus has been also known. However, in this display means, only one frame memory in which a plurality of images are stored is provided; therefore, to change the display locations of the images, the image data of as much as one screen has to be retransferred from the CPU, so that there is a drawback such that the display image cannot be easily changed.

SUMMARY OF THE INVENTION

The present invention is made to solve the drawbacks in the foregoing conventional image display apparatus and intends to provide an image display apparatus in which one picture plane is divided and a plurality of desired images can be easily displayed by a simple operation, and at the same time the display locations of such plurality of images can be easily changed and the display of a plurality of images can be easily changed.

The present invention comprises means for storing segment addresses of a plurality of selected image data and means for selectively taking out those segment addresses and forming the addresses of an image memory of one picture plane on which those plurality of images are combined and displayed, in which the content of the image memory is read out on the basis of the image memory addresses and one picture plane is divided and those plurality of images are simultaneously displayed on the divided picture planes.

Further practically speaking, the invention comprises: address registers for respectively storing segment addresses indicative of a plurality of selected image data; line and column counters for determining the lines and columns of one picture plane which is displayed; a selector for selecting one of the outputs of the address registers in response to the MSB outputs of those line and column counters; and an adder for adding the data, as a high order address, of the address register selected by the selector and the outputs, as low order addresses, of the line and column counters, thereby forming the addresses of the image memory of one picture plane which is displayed, in which the display images are sequentially changed by inputting the segment address of the image data which is newly displayed into the address register at the forefront stage.

With such an arrangement of the image display apparatus as mentioned above, in case of dividing one picture plane and displaying a plurality of images on the divided picture plane, a plurality of desired image data are searched and selected, their segment addresses are respectively stored in the address registers, the segment addresses are selectively taken out from the address registers to form the addresses of the image memory (video RAM) of one picture plane in which a plurality of images are combined, the memory content is read out on the basis of these addresses, thereby enabling a plurality of images to be displayed on display means such as a CRT or the like. Therefore, a plurality of desired images can be easily and accurately displayed on one screen. Further, the display images and display locations can be also easily changed or the like.

BRIEF DESCRIPTION OF THE DRAWINGS

FIG. 3 is a timing chart showing the relation among a horizontal sync signal, MSBs of line and column counters, and the unit image numbers which are displayed;

DESCRIPTION OF THE PREFERRED EMBODIMENTS

An embodiment of the present invention will now be described hereinbelow.

In the invention, a plurality of desired images are searched and the image data to form an image of one screen by combining those images taken out from an image file apparatus in which a number of digital images have been filed, and the taken-out image data is stored into a video RAM, and this image data is taken out from the video RAM and is displayed on a CRT.

Figure 1:
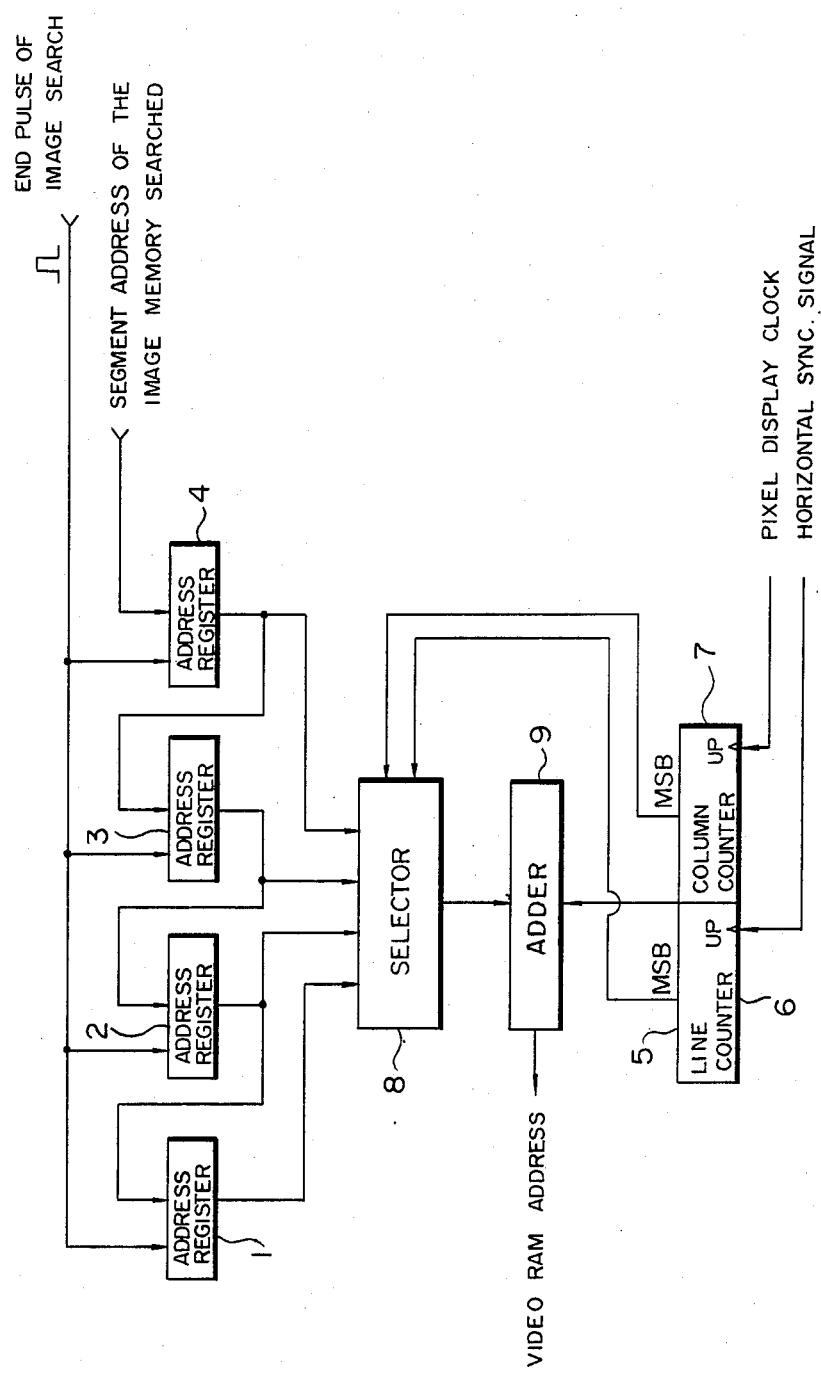
FIG. 1 is a block arrangement diagram of one embodiment of an image display apparatus of the present invention.

FIG. 1 shows one embodiment of the present invention and is a block arrangement diagram of an image display apparatus which is constituted so as to simultaneously display four desired unit images on one screen. In the diagram, reference numerals 1, 2, 3, and 4 respectively denote first to fourth address registers for storing segment addresses of respective four searched and selected unit image data in order to synthesize and display those four unit images on one screen. A segment address of a new desired unit image data upon which the search has been completed is input into the fourth address register 4 at the forefront stage. An output of the fourth address register 4 is connected to an input terminal of the third address register 3 at the next stage. In a similar manner as above, an output terminal of the front stage is sequentially cascade connected to an input terminal of the next stage.

On one hand, and end pulse of image search is simultaneously applied to the respective address registers 1 to 4. The memory contents of the respective address registers 1 to 4 can be sequentially changed from the front stage to the next stage by that pulse.

A pixel counter 5 consists of a line counter 6 and a column counter 7. A horizontal sync signal is input to the line counter 6 and a pixel display clock signal is input to the column counter 7. Each output of the address registers 1 to 4 is input to a selector 8. The selector 8 selects one of the outputs of the address registers 1 to 4 in response to an output of each MSB (most significant bit) of the line counter 6 and column counter 7.

An adder 9 adds the data, of the as a high order address, and the outputs, of the line counter 6 and column counter 7 as low order addresses, thereby forming the addresses of the image memory (video RAM) of one picture plane to be synthesized and displayed.

Figure 2:
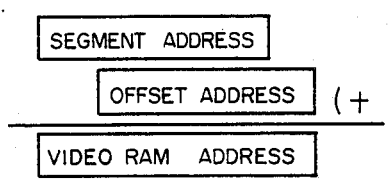
FIG. 2 is an explanatory diagram for explaining a method of making addresses of a video RAM.

FIG. 2 is an explanatory diagram showing the state whereby the addresses of the image memory of one picture plane (video RAM addresses) are produced when a plurality of images are synthesized and displayed on one screen. In the diagram, the segment address denotes the segment address of each unit image data stored in the address registers 1 to 4 in FIG. 1, respectively, and constitutes the high order address of the video RAM address. The offset address indicates an output of the pixel counter 5, namely, an output which is obtained by connecting in parallel the line counter 6 and column counter 7 and constitutes the low order addresses of the video RAM addresses. The addresses of the image memory of one picture plane which are displayed, namely, the video RAM addresses are produced by adding the segment address and offset address.

Each pixel data is sequentially stored in the image memory of each unit image which is synthesized and displayed on one screen in accordance with the order of from the offset address 0 of the designated segment address. Each pixel data is sequentially raster scanned from the left upper portion of the screen of the display means such as a CRT or the like.

The operation of the image display apparatus constituted as described above will then be explained. For simplicity of explanation, it is assumed that the display pixels of one picture plane to be displayed, that is, the display pixels of the whole screen of the display means consist of 512×512 dots and the display pixels of ¼ screen consist of 256×256 dots and each of the line counter 6 and column counter 7 is a nine-bit binary counter.

First, four respective desired unit images which should be displayed on one screen are searched and selected and the segment address of the data of each unit image is sequentially input to the address register at the forefront stage in accordance with the order of the search, thereby allowing each segment address of the four selected unit images to be stored in the address registers 1 to 4, respectively. Next, a horizontal sync signal and a pixel display clock signal are input to the line and column counters 6 and 7 in the pixel counter 5. The selector 8 selects an output (segment address) of the first address register 1 when the MSB of the line counter 6 is 0 and the MSB of the column counter 7 is 0, while the selector 8 selects an output of the second address register 2 when the MSB of the line counter 6 is 0 and the MSB of the column counter 7 is 1. Similarly, when the MSB of the line counter 6 is 1 and the MSB of the column counter 7 is 0, an output of the third address register 3 is selected; when the MSB of the line counter 6 is 1 and the MSB of the column counter 7 is 1, an output of the fourth address register 4 is selected, respectively.

Therefore, as shown in a timing chart of FIG. 3, when the output of the line counter 6 is 0 and the output of the column counter 7 lies within a range of 0 to 255, namely, while the MSB of the column counter 7 is 0, the output of the first address register 1 is selected by the selector 8. The segment address of the first unit image and the offset address from the pixel counter 5 are added by the adder 9, so that the address corresponding to the first line of the first unit image is produced. Next, when the output of the column counter 7 lies within a range of 256 to 512, that is, while the MSB of the column counter 7 is 1, the output of the second address register 2 is selected, so that the address corresponding to the first line of the second unit image is produced. Due to this operation, the address of the first line of the image memory of one picture plane that is synthesized and displayed is formed. This operation is repeated until the output of the line counter 6 becomes 255 (MSB=0), so that the addresses of the first to 255th lines of the image memory of one picture plane which is displayed are produced.

When the output of the line counter 6 becomes 256, the MSB of the line counter 6 becomes 1, so that the output of the third address register 3 is selected until the output of the column counter 7 becomes 255, so that the address corresponding to the first line of the third unit image is formed. Next, when the output of the column counter 7 lies within a range of 256 to 512, the output of the fourth address register 4 is selected, so that the address responsive to the first line of the fourth unit image is formed. When the output of the line counter 6 lies within a range of 256 to 512, this operation is repeated and the addresses of the 256th to 512nd lines of the image memory of one screen that is displayed are produced.

Figure 4:
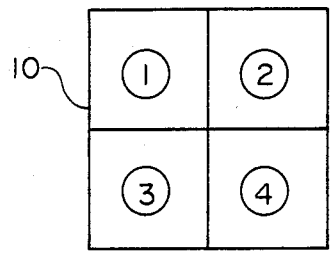
FIG. 4 is a schematic diagram showing an image on one screen formed by combining four unit images.

In this way, the addresses of the video RAM of one picture plane which is displayed are produced and the data of each image memory of each unit image to be synthesized is read out by those addresses and is displayed on the CRT. Thus, as shown in FIG. 4, one screen (whole display surface) 10 is divided into four parts and the first to fourth unit images can be simultaneously displayed on these four divided screens.

There will be next described the operation for sequentially changing the segment address of each unit image which has been respectively stored in each address register in order to change a plurality of unit images that are selectively displayed on the same screen.

When a desired unit image to be newly displayed is searched and this search is finished, the image data searched is temporarily loaded into a buffer memory (not shown) which can store the data of as much as one unit image. The segment address of the image data is input to the fourth address register 4.

Upon completion of the loading of the image data of the new searched unit image into the buffer memory, an end pulse of image search is applied to each of the address registers 1 to 4. In response to the input of this pulse, the data (segment addresses) stored in the second to fourth address registers 2 to 4 are respectively loaded into the first to third address registers 1 to 3. On one hand, the segment address of the unit image data stored in the newly searched buffer memory is loaded into the fourth address register 4.

As described above, by changing the segment address which is stored into each address register, the combinational unit images of one screen which are synthesized and displayed can be easily changed.

In the case where a further next desired unit image is searched and this unit image is added and the images of one screen are displayed, the image memory in which the image data (first unit image data) corresponding to the first segment address stored in the first register 1 has been loaded is empty, so that this image memory can be used as a buffer memory. The image data of the foregoing newly searched unit image can be loaded into this buffer memory.

Figure 5:
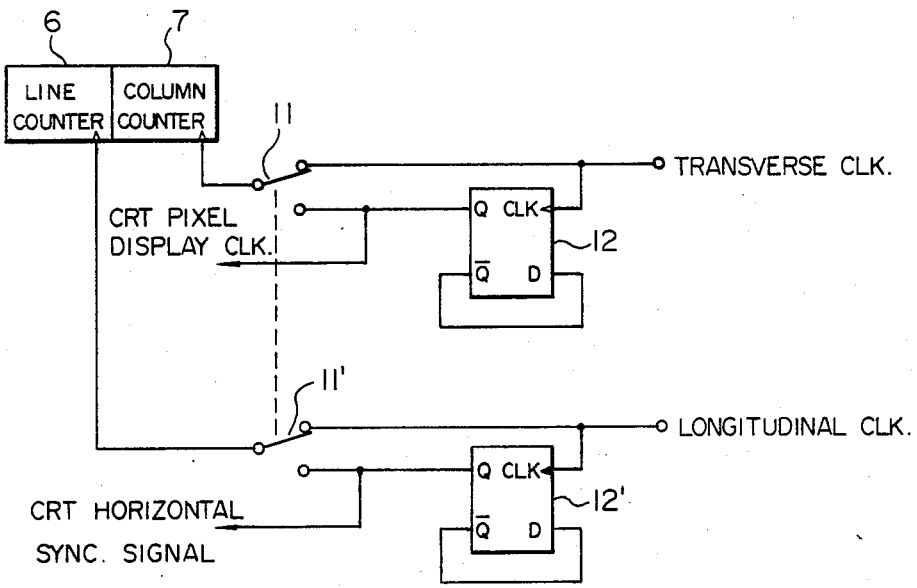
FIG. 5 is a block arrangement diagram showing the main part of another embodiment of the invention.

FIG. 5 is a block arrangement diagram showing the main part of the second embodiment. This embodiment shows an example whereby each unit image can be reduced and displayed in order to display on one screen of the display means a plurality of unit images having the pixels of the same number of bits as the resolution of this one screen, or can be switched to the standard display size.

For instance, in the case where the resolution of the display apparatus (CRT) is $512 \times 512 \times 8$ bits and a memory of $512 \times 512 \times 8$ bits is used as an image memory in which four unit image data, which are simultaneously displayed on four small screens obtained by dividing one screen, are respectively stored, each unit image data is sampled for every other pixel with regard to both line and column and each frequency of the pixel display clock and horizontal sync signal is further doubled, thereby making it possible to reduce each unit image to the image of the pixels as many as $256 \times 256$ and to display it. Consequently, even in case of the unit image having the pixels of the same number of bits as mentioned above, four unit images can be displayed on one screen.

In the embodiment shown in FIG. 5, as a transverse clock and a longitudinal clock, the clocks having the frequencies that are respectively twice the frequencies of the pixel display clock and horizontal sync signal in the embodiment shown in FIG. 1 are used. Those clocks are connected through D flip flops 12 and 12' or directly to the line counter 6 and column counter 7 due to the switching operations of change-over switches 11 and 11', respectively. In the case where they are directly connected without using the D flip flops 12 and 12', the reduction display can be performed. In the case where they are connected through the D flip flops 12 and 12', the standard display can be executed. Each Q output of the D flip flops 12 and 12' is also used as a pixel display clock and a horizontal sync signal to the CRT, respectively.

In each of the foregoing embodiments, the apparatuses which simultaneously display four unit images on one screen have been shown. However, the number of unit images which are displayed on one screen is not limited to four, but various numbers of unit images such as sixteen unit images or the like can be simultaneously displayed.

What is claimed is:

1. An image display apparatus for simultaneously displaying a plurality of selected separate images on one screen of a video display, comprising;
    image data segment address-storing means for storing respective segment addresses of a plurality of selected image data stored in an image memory file, said segment address storing means is formed by a plurality of address registers of which an output of a front address register stage thereof is cascade connected to an input of the next address register stage thereof; and
    image display memory address-forming means for selectively taking-out said stored segment addresses and forming image display memory addresses of an image display memory for one picture plane on which said plurality of selected image date are to be combined and simultaneously displayed, said segment address storing means is configured in a manner such that a segment address of new image data to be displayed subsequently to an image presently being displayed is input to the address register at the forefront stage, and a load pulse is applied to all of said address registers upon completion of the selection of said new image data and the content of each of said address registers is sequentially changed,
    wherein contents of said image memory file in which said plurality of selected image data are stored are read-out on the basis of said image display memory addresses whereby said plurality of selected image data are simultaneously displayed on one screen of a video display means.

2. An image display apparatus according to claim 1, wherein said image display memory address-forming means comprises:
    a line counter means and a column counter means for determining lines and columns of one picture plane which is to be displayed;
    a multi-input selector means for selecting one of plural outputs of said segment address storing means in response to MSB outputs of said line counter means and column counter means; and
    means for adding the data of the segment address selected by said selector as a high address, and the outputs of said line counter and column counter, as low order addresses.

3. An image display apparatus according to claim 2, wherein a horizontal sync signal and a pixel display clock which are applied to said display means are respectively input to said line counter means and column counter means;

4. An image display apparatus according to claim 2, wherein a longitudinal clock and a transverse clock having the same respective frequencies as those of a horizontal sync signal and a pixel display clock which are applied to said display means, or a longitudinal clock and a transverse clock having respective frequencies that are twice the frequencies of a horizontal sync signal and a pixel display clock which are applied to the display means are selectively input to said line counter means and column counter means, respectively, and when the longitudinal clock and transverse clock having the doubled frequencies are input respectively to said line counter means and column counter means, the plurality of selected image data are sampled for every other pixel with respect to both line and column.

* * * * *